US012587522B2

(12) United States Patent
Chilamakuri et al.

(10) Patent No.: US 12,587,522 B2
(45) Date of Patent: Mar. 24, 2026

(54) DATA CLASSIFICATION LABEL MANAGEMENT AND ACCESS CONTROL

(71) Applicant: SAP SE, Walldorf (DE)

(72) Inventors: Sateesh Babu Chilamakuri, Tirupati (IN); Sathya G, Ernakulam (IN)

(73) Assignee: SAP SE, Walldorf (DE)

( * ) Notice: Subject to any disclaimer, the term of this patent is extended or adjusted under 35 U.S.C. 154(b) by 164 days.

(21) Appl. No.: 18/382,455

(22) Filed: Oct. 20, 2023

(65) Prior Publication Data

US 2025/0133073 A1     Apr. 24, 2025

(51) Int. Cl.
*H04L 9/40* (2022.01)
*G06F 16/906* (2019.01)

(52) U.S. Cl.
CPC .......... *H04L 63/083* (2013.01); *G06F 16/906* (2019.01); *H04L 63/0823* (2013.01); *H04L 63/20* (2013.01)

(58) Field of Classification Search
CPC ...... G06F 16/90; H04L 63/0823; H04L 63/20
See application file for complete search history.

(56) References Cited

U.S. PATENT DOCUMENTS

2004/0015701 A1*   1/2004   Flyntz ................. G06F 21/6218
                                                                                 713/182
2010/0263060 A1*   10/2010   Charbonneau .......... G06F 21/62
                                                                                 726/30

2011/0126281 A1*   5/2011   Ben-Zvi .............. G06F 21/6218
                                                                                 726/21
2012/0179961 A1*   7/2012   Stollman ................ G06F 40/30
                                                                                 715/243
2014/0059700 A1*   2/2014   Kiriyama .............. G06F 21/606
                                                                                 726/27
2015/0020213 A1*   1/2015   Decouteau ............ H04L 63/105
                                                                                 726/27
2015/0199405 A1*   7/2015   Redlich ............... G06F 16/2455
                                                                                 707/770
2019/0347429 A1*   11/2019   Jean-Louis ............ G06N 5/022
2021/0377240 A1*   12/2021   Beemer ................ H04L 63/105
2024/0249016 A1*   7/2024   Shashanka .......... G06F 21/6245

* cited by examiner

*Primary Examiner* — Hee Soo Kim
(74) *Attorney, Agent, or Firm* — Klarquist Sparkman, LLP

(57)     ABSTRACT

Systems and processes for managing and applying data classification labels are provided. In a method for managing data classification labels, a request may be received from a client application to fetch data classification labels from a policy server. Authentication information may be retrieved and passed to the policy server, and an access token may be received from the policy server based on a rights check performed using the authentication information. The access token may be provided to an interface for the policy server for use in generating a request for a list of data classification labels accessible via the access token, and the list of data classification labels may be received. Output data usable by the client application to generate a presentation of the list of data classification labels for selection by a user of the client application to classify data managed by the client application may be generated.

20 Claims, 8 Drawing Sheets

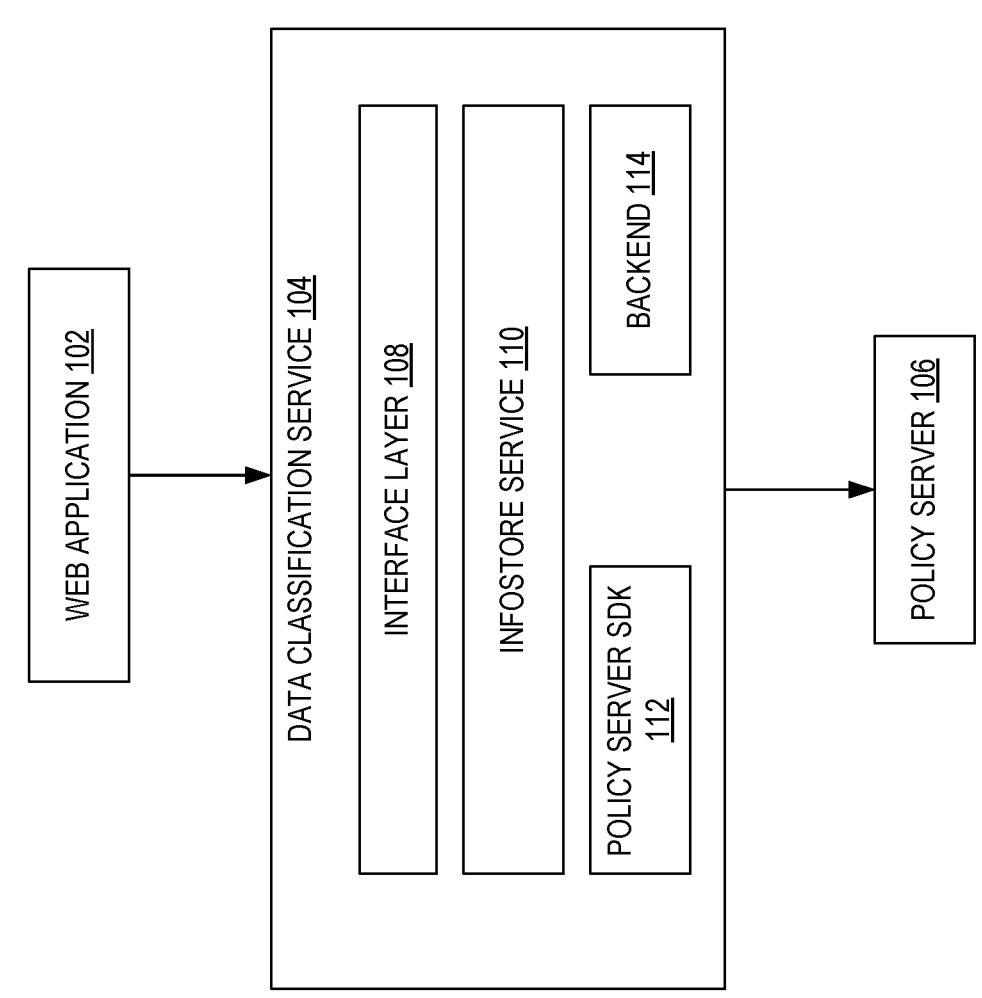
FIG. 1

Figure 4:
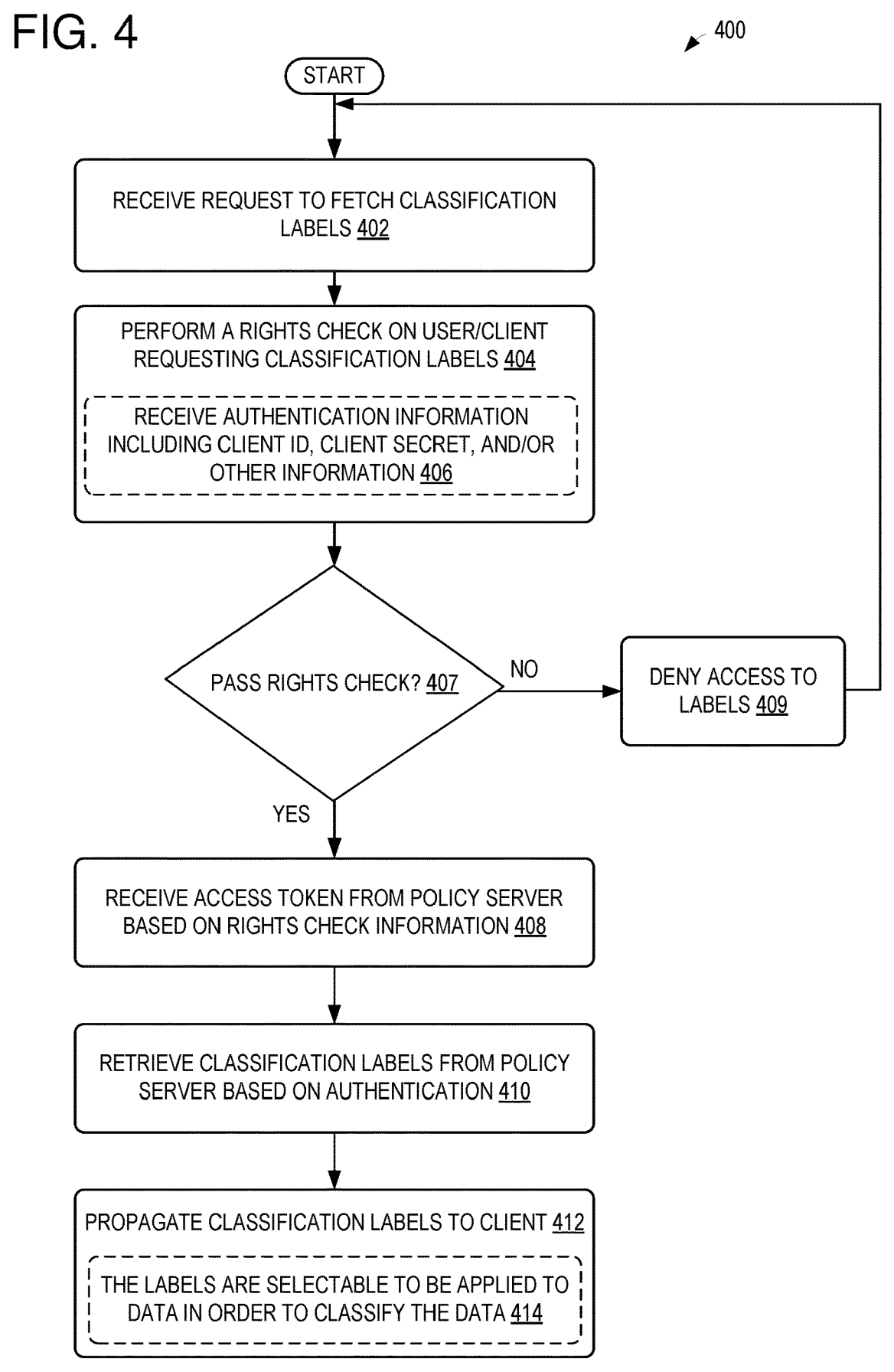

START

RECEIVE REQUEST TO FETCH CLASSIFICATION LABELS 402

PERFORM A RIGHTS CHECK ON USER/CLIENT REQUESTING CLASSIFICATION LABELS 404

RECEIVE AUTHENTICATION INFORMATION INCLUDING CLIENT ID, CLIENT SECRET, AND/OR OTHER INFORMATION 406

PASS RIGHTS CHECK? 407

NO → DENY ACCESS TO LABELS 409

YES

RECEIVE ACCESS TOKEN FROM POLICY SERVER BASED ON RIGHTS CHECK INFORMATION 408

RETRIEVE CLASSIFICATION LABELS FROM POLICY SERVER BASED ON AUTHENTICATION 410

PROPAGATE CLASSIFICATION LABELS TO CLIENT 412

THE LABELS ARE SELECTABLE TO BE APPLIED TO DATA IN ORDER TO CLASSIFY THE DATA 414

502

```
PROPERTY VALUE IS : PERSONAL     ABCD9999-XXXX-0000-123
PROPERTY VALUE IS : PUBLIC       ABCD9999-XXXY-0001-124
PROPERTY VALUE IS : GENERAL      ABCD9999-XXXZ-0002-125
        INNER PROPERTY VALUE IS : ANYONE (UNRESTRICTED)    ABCD9999-XXYZ-0003-125
        INNER PROPERTY VALUE IS : ALL EMPLOYEES        ABCD9999-XYZZ-0003-125
```

LABEL
DESERIALIZING 504

506

508

LABELS ▽

PERSONAL

PUBLIC

510

GENERAL     ANYONE

ALL EMPLOYEES

REPORT

Figure 6:
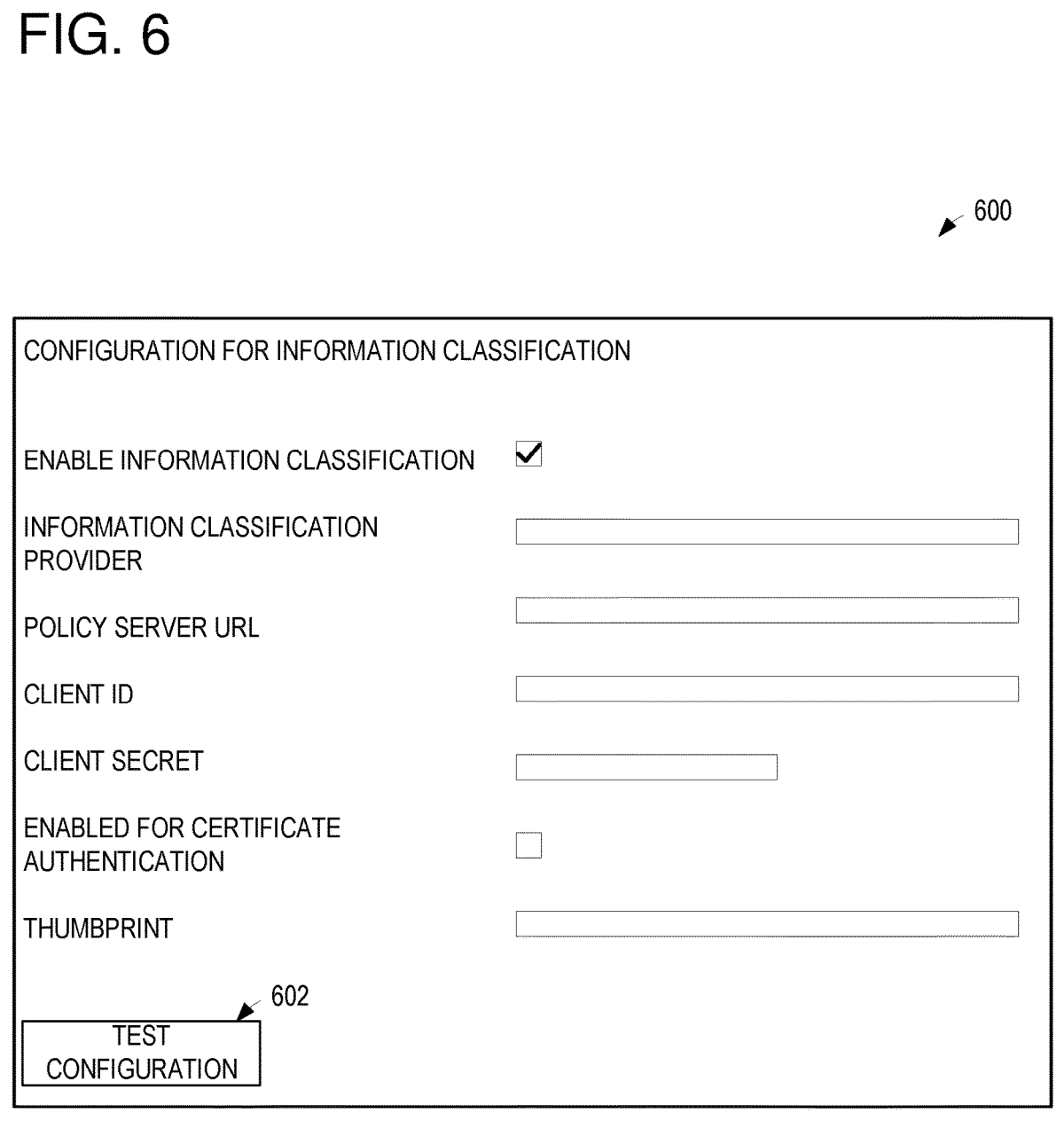

CONFIGURATION FOR INFORMATION CLASSIFICATION

ENABLE INFORMATION CLASSIFICATION    ☑

INFORMATION CLASSIFICATION
PROVIDER

POLICY SERVER URL

CLIENT ID

CLIENT SECRET

ENABLED FOR CERTIFICATE
AUTHENTICATION                       ☐

THUMBPRINT

602

TEST
CONFIGURATION

FIG. 7
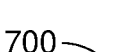
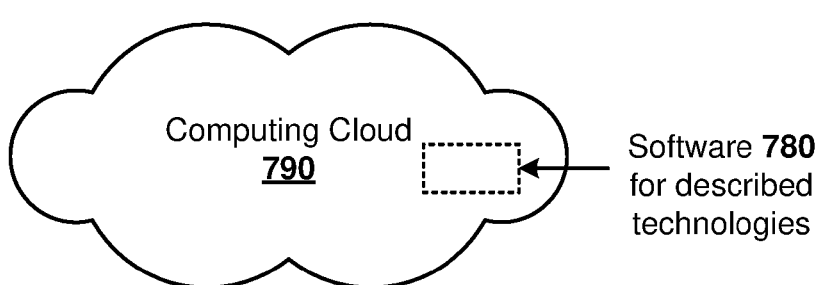
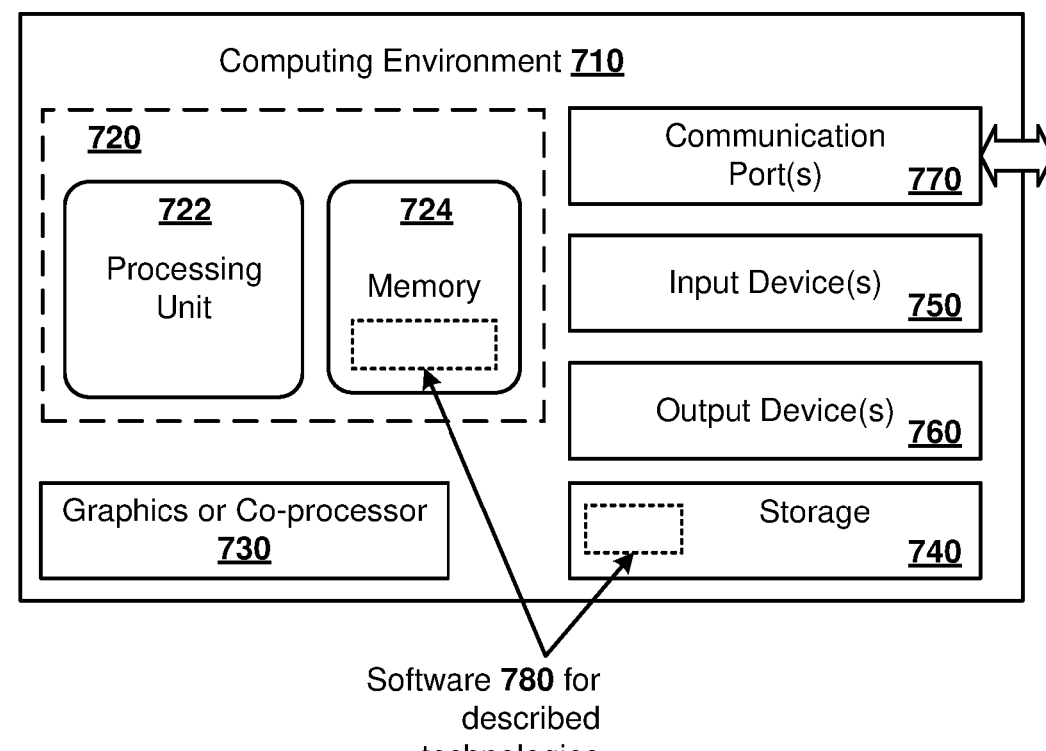

800

COMPUTING CLOUD
890

Software 880
for described
technologies

COMPUTING
DEVICE 812

880

COMPUTING
DEVICE 816

880

COMPUTING
DEVICE 814

880

DATA CLASSIFICATION LABEL MANAGEMENT AND ACCESS CONTROL

BACKGROUND

Organizations typically communicate and store large amounts of data during operation. The data associated with these operations may have different levels of security and/or protection targets based on content, context, and/or other features of the data. In order to control how such differently levels of security and/or protection are applied to the communication and/or storage of the data, labels may be applied to the data to designate a respective classification for the data.

However, the number and type of labels may vary between organizations, and accessibility to the labels may vary for different users and/or clients associated with the organizations. Accordingly, there remains a need for improved technologies to manage data classification labels and control the distribution and application of such labels in a secure manner, while maintaining extensibility within and among different organizations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing data classification using a classification framework. In some examples, the disclosed technologies can be implemented as computer-readable media storing instructions which, when executed by one or more hardware processors, cause the hardware processors to perform the following actions. A request to fetch data classification labels is received from an application. A rights check is performed based on authentication information of the application. Responsive to passing the rights check, an access token is received from a policy server based on the authentication information. The data classification labels are retrieved from the policy server using the access token, and the data classification labels are formatted for presentation via the application. The formatted data classification labels are output, to the application, for display via a graphical user interface of the application, the formatted data classification labels being selectable for applying to targeted data in the application.

In some examples, the disclosed technologies can be implemented as a method performed by a computer. A request to fetch data classification labels from a policy server is received from a client application. Authentication information for the client application is retrieved and passed to the policy server. An access token is received, based on a rights check performed using the authentication information, from the policy server. The access token is provided to an interface for the policy server for use in generating a request for a list of data classification labels accessible via the access token. The list of data classification labels is received. Output data corresponding to the list of data classification labels is generated, for output to the client application, the output data usable by the client application to generate a presentation of the list of data classification labels for selection by the user of the client application to classify data managed by the client application.

In some examples, the disclosed technologies can be implemented in a system including one or more hardware processors with coupled memory, and computer-readable media storing instructions executable by the one or more hardware processors. The instructions include first, second, third, and fourth instructions. The first instructions, when executed, cause data classification labels to be retrieved from a policy server based on at least a first rights check and cause the data classification labels to be propagated to an application executing on a web client, the first rights check being performed to secure the data classification labels by controlling access to the data classification labels based on a first transmission of authentication information from the application. The second instructions, when executed, cause an indication to be received from the application that a first data classification label of the data classification labels is to be applied to a data file. The third instructions, when executed, cause a second rights check to be performed based on a second transmission of authentication information from the application. The fourth instructions, when executed, cause the first data classification label to be applied to the data file and process the data file in accordance with the applied first data classification label responsive to passing the second rights check.

The foregoing and other objects, features, and advantages of the invention will become more apparent from the following detailed description, which proceeds with reference to the accompanying figures.

BRIEF DESCRIPTION OF THE DRAWINGS

FIG. 1 is a block diagram of an example system for managing data classification in accordance with examples of the present disclosure.

FIG. 4 is a flow chart of an example method for managing data classification in accordance with examples of the present disclosure.

FIG. 6 shows an example user interface for providing configuration information for use in authenticating data classification label requests in accordance with examples of the present disclosure.

FIG. 7 is a diagram schematically depicting a computing environment suitable for implementation of disclosed technologies.

DETAILED DESCRIPTION

Introduction and Overview

Figure 2:
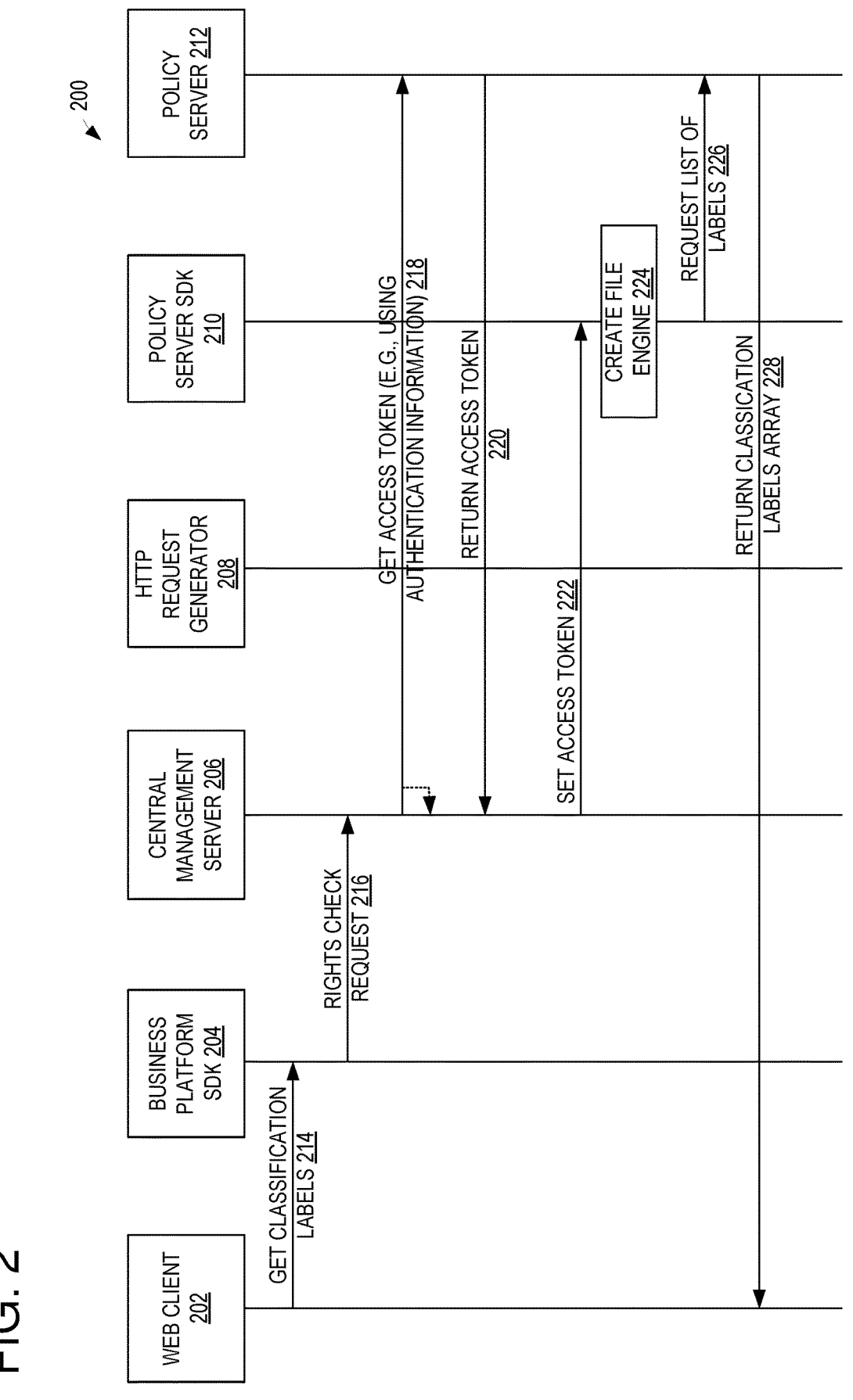
FIG. 2 is a communication diagram for an example system for managing data classification in accordance with examples of the present disclosure.

An increasingly prevalent concern for organizations relates to protecting data sensitivity to maintain data security for business practices and other considerations. In analytical applications, data that is to be retrieved may be used in analytical applications (e.g., reports), which are delivered and/or scheduled to be delivered to destinations (e.g., enterprise users or outside users) based on authorization. Some reports may include sensitive information that benefit from additional protection. In order to control different levels of protection for data, organizations may define labels such as confidential, highly confidential, public, internal, etc. Such labels may vary between organizations based on data security goals.

The disclosure describes a new approach to integrating all of the different types of labels and other customized data classifications into an analytical framework, which is also able to provide security for the labels via access control using authentication routines (e.g., rights checks). One example advantage of the disclosed technologies is that all customers may be managed by a computing engine, which is abstracted with existing framework. Accordingly, a user who is scheduling a report for a specific destination may set and/or retrieve labels from an existing policy server. For example, an administrator may configure labels for different users. When a first user connects to an application, the application may check whether the first user has enough rights to reach an associated policy server managing and/or storing the labels. In response to determining that the first user does have such rights, the policy server may be accessed by providing authorization-related values (e.g., user identifiers, passwords, secrets, etc.) and labels that the administrator has assigned to the first user may be retrieved. When a file (e.g., a report, document, etc.) is generated and/or prepared for communication, data security may be ensured by allowing for the application of labels defined by the organization for the user as retrieved from the policy server.

Example System

FIG. 1 shows an example block diagram of a system 100 for managing data classification in accordance with examples of the present disclosure. In some examples, a web application 102 may be used to generate, transmit, and/or otherwise interact with data such as documents (e.g., reports), files, communications (e.g., e-mails), etc. The web application 102 may be installed and/or executed on a user device or client device (e.g., a computing system) and may allow a user to perform business operations associated with an organization and/or to interface/communicate with a system of the organization.

The web application 102 may utilize a data classification service 104 to access and/or implement policies stored in a policy server 106. For example, as described above, policies such as labels for data classification in association with the organization may be stored and/or managed by the policy server 106. In some examples, an administrator may define and/or update labels in the policy server 106, including adding, removing, and/or changing behavior for labels, as well as creating, removing, and/or adjusting authorization for use of the labels (e.g., controlling access/use of the labels for different users or other entities). Some non-limiting examples of labels may include "Personal," "Public," "General," "Confidential," "Highly Confidential," etc., and the labels may correspond to a level of security and/or sensitivity of associated data/documents. In some examples, labels may have subcategories corresponding to further granularity of levels of security, sensitivity, etc. For example, one or more of the above labels (e.g., "Confidential" in a non-limiting example) may have one or more subcategories for different defined groups, such as "anyone" (e.g., unrestricted), "all employees," "trusted people," "specific people," etc.

The data classification service 104 may be implemented on one or more computing systems (e.g., one or more computing devices, one or more distributed computing systems, one or more cloud computing environments, etc.) and may include subsystems and/or engines for controlling access to and/or otherwise managing the classification of data for one or more organizations. For example, although a single web application 102 and a single policy server 106 is shown as being connected to data classification service 104, it is to be understood that multiple web applications may access/interact with the policy server and/or may access/interact with multiple policy servers via the data classification service in some examples.

As shown, the data classification service 104 may include an interface layer 108 for communicating between systems on different platforms. For example, the interface layer 108 may include a Common Object Request Broker Architecture (CORBA) layer operating in accordance with the CORBA standard to utilize an interface definition language (IDL) to specify interfaces that objects present and to map from the IDL to a targeted language. The data classification service 104 may also include an infostore service 110 that includes memory, a storage device, and/or an interface to a remotely-located memory/storage device for storing data usable by the data classification service. For example, the infostore may include a repository that stores configurations set by administrators (e.g., the respective configurations specifying a policy server, client secret, client ID, etc. for use in accessing data classification labels).

The policy server software development kit (SDK) 112 may be used to build support for applying labels and protection to data (e.g., files, documents, etc.) and to define and/or implement actions that are taken based on labels applied to the data. A backend 114 may include systems such as a hypertext transfer protocol (HTTP) client service (e.g., HTTP request generator) and/or central management server, which may interface with the policy server 106 through the policy server SDK 112, for example as described in more detail below with respect to FIG. 2, to perform rights checks and fetch classification labels. The backend 114 may be used to retrieve and pass along sensitive information, such as labels, dynamically on request in order to avoid storing the sensitive information and to ensure that a latest version of the labels is available for the web application. For example, as described below, authentication information that passes through the backend 114 for performing a rights check to determine labels that may be retrieved for a user may be directly received from the web client and/or an intermediate business information service and passed to the policy server SDK 112 without persistent storage at the backend 114 in some examples. In additional or alternative examples, retrieved labels may be received from the policy server 106 and passed to the web client without persistent storage at the backend 114. In still further additional or alternative examples, the backend 114 may access an encrypted repository for performing rights checks (e.g., checking authentication information and/or certificates against stored, encrypted authentication information and/or certificates entered by an administrator during an onboarding operation). The backend 114 may be registered for access with the policy server. In some examples, the web application 102 may be registered for access with the policy server according to configuration information entered by an administrator of the web application during an onboarding operation. Accordingly, a user of the web application 102 may be delivered labels for use in data classification based on authentication information provided by the web application 102 automatically, as described in more detail below.

FIG. 2 shows an example communication diagram 200 for retrieving labels for use by a user of a web client 202. The communications described in diagram 200 may occur between the web client 202, which may be an example of and/or included in the web application 102 of FIG. 1, a business platform SDK 204, central management server 206, and HTTP request generator 208, one or more of which may be included in a backend such as backend 114 of FIG. 1, a policy server SDK 210, which may be an example of policy server SDK 112 of FIG. 1, and policy server 212, which may be an example of policy server 106 of FIG. 1.

At 214, the web client 202 sends a request for classification labels to business platform SDK 204. The request may be sent responsive to a user request input at the web client 202 and/or otherwise as a result of user interactions with the web client 202. In some examples, the request for classification labels may include authentication information, such as a user identifier, client identifier, client secret, certificate information (e.g., thumbprint for certificate authentication), and/or other authentication information. For example, the authentication information may be configured for the web client 202 by an administrator during an onboarding process, and provided automatically with the request. At 216, the business platform SDK sends a rights check request to the central management server 206. In some examples, the authentication information may alternatively or additionally be generated and/or fetched by the central management server in response to the rights check request.

For example, the central management server 206 may compare the authentication information to encrypted authentication information stored in a repository accessible by the central management server 206 and, responsive to authenticating the user, create (with the help of the HTTP request generator 208) a uniform resource locator (URL) for use by the policy server SDK 210 to access the policy server 212. Accordingly, at 218, the central management server 206 sends a request to the policy server 212 (via the policy server SDK 210) to get an access token at 220 using the authentication information (e.g., client identifier, client secret, etc. as described above). In some examples, the central management server 206 may perform a rights check as well, comparing the received authentication information to encrypted authentication information stored at a repository (e.g., a storage device) that is accessible by the central management server 206 (e.g., to perform a certificate check and/or a check of other authentication information such as client ID, client secret, etc.). In an example where the authentication at the central management server 206 fails (e.g., the retrieved/received authentication information does not match encrypted authentication information in the repository), the central management server 206 may deny the request for labels and may not send a request for access or a request for labels to the policy server 212. The policy server 212 may authenticate the user using the authentication information and return to the central management server 206 an access token that corresponds to the user and/or rights defined for the user (in the event the authentication for the user passes). In examples where the authentication at the policy server fails, the policy server 212 may return a notice of the authentication failure and may deny the request for an access token.

At 222, the central management server 206 may set and/or pass the access token to the policy server SDK 210. In other examples, instead of or in addition to sending authentication information and receiving a token, the policy server 212 may generate a certificate and the certificate may be compared with the authentication information to authorize the user. The policy server SDK 210 may create a policy server engine, as indicated at 224, configured to generate a request for classification labels in accordance with the rights provisioned to the user, and send the request for the list of labels to the policy server 212 (including the access token), as indicated at 226. For example, as described above, the policy server SDK 210 may be configured to provide mechanisms (e.g., Application Programming Interfaces [APIs], etc.) to allow access to the policy server 212. In response to receiving a valid access token, the policy server 212 may generate and return an array or list of classification labels to the web client 202, as indicated at 228. For example, the array of classification labels may include all classification labels authorized for use by the user of the web client 202 (e.g., based on the access token/authentication information and/or based on additional information specific to the user) for viewing by the user at the web client.

Figure 5:
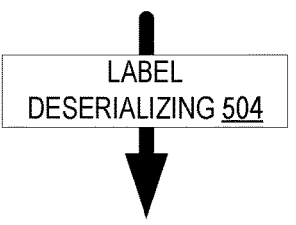
FIG. 5 shows an example translation of label data received from a policy server to a displayable format of the labels presented in a graphical user interface in accordance with examples of the present disclosure.

In some examples, the returned array may be transformed and/or translated to a displayable format and/or a format compatible with the web client 202 (or application executed thereon) by one or more of the HTTP request generator 208, the central management server 206, the business platform SDK 204 and/or the web client 202. For example, a user interface of the web client 202 may be configured to display, in a graphical user interface of the web client 202, each of the labels to the user for selection to apply to data (e.g., a document, file, report, etc.). In some examples, the displayed labels may be presented as selectable items in a menu (e.g., with subcategories of labels presented upon selection of an associated parent category). The user may then select one or more of the labels to apply to a targeted file or other data using the web client. An example of applying the labels is described in more detail below with respect to FIG. 3. Turning briefly to FIG. 5, an example translation of labels to a displayable format is shown. For example, an array 502 of label data received from a policy server (e.g., policy server 212 of FIG. 2) may undergo label deserializing 504 to extract individual labels and translate the labels into a format that is consumable by a web application (e.g., executing on web client 202 of FIG. 2) to generate a selectable representation of the labels in a graphical user interface 506. For example, as shown the labels from array 502 may be presented in a dropdown menu 508 (e.g., including submenus for any subcategories of labels, such as the subcategories for the "general" label) for selection to be applied to a report or other data 510. In some examples, multiple labels may be applied via check boxes or other selection mechanisms provided in association with the presented labels. It is to be understood that the user interface shown in FIG. 5 is exemplary, and the labels may be formatted and provided for presentation in other manners without departing from the scope of the disclosure. For example, a list of the labels may be presented to the user in a graphical, audible, or other format, and the user may apply labels by entering an identifier for each respective label the user wishes to apply to a data file.

Figure 3:
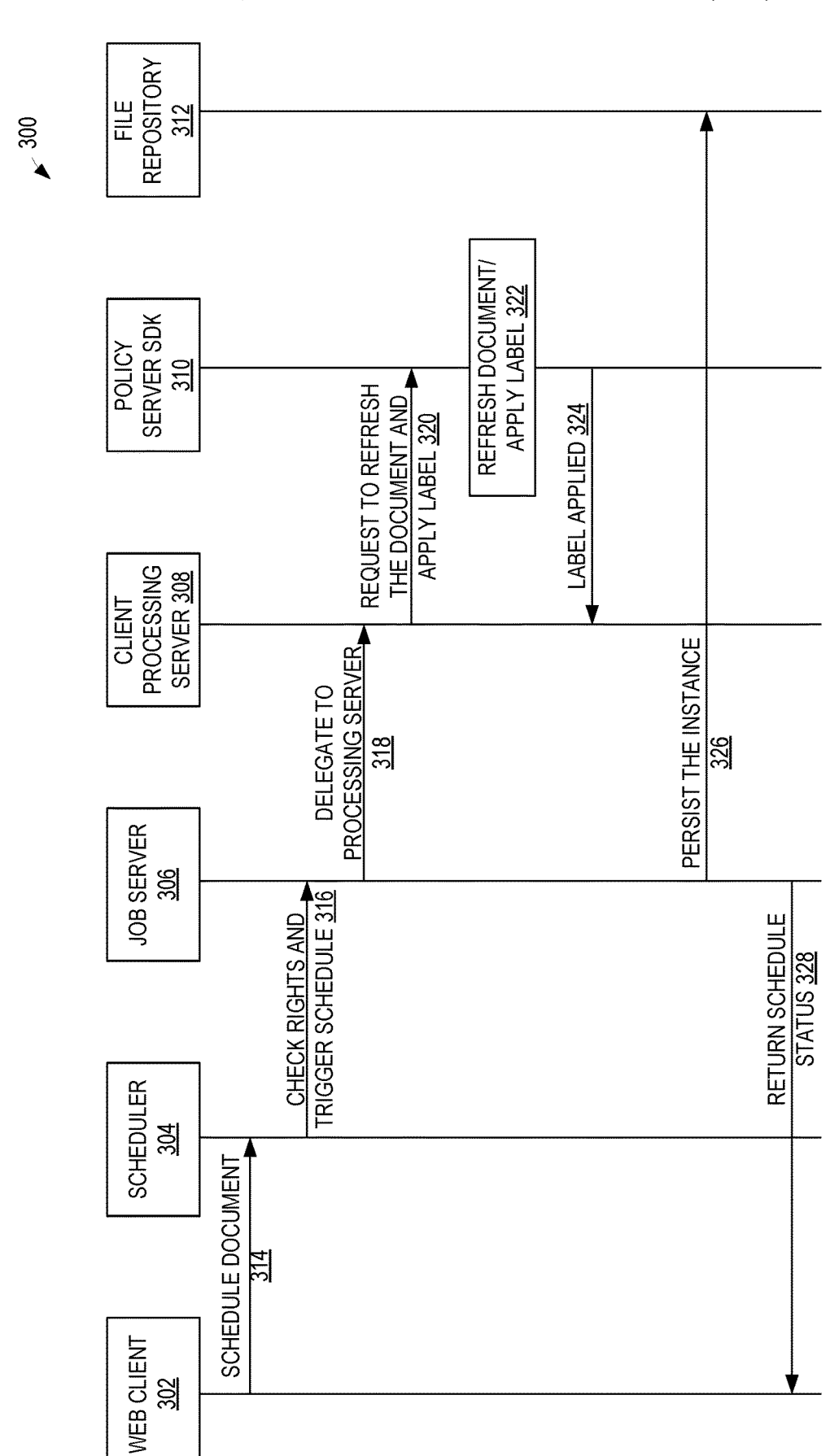
FIG. 3 is a communication diagram for an example system for scheduling documents using classification labels in accordance with examples of the present disclosure.

FIG. 3 is an example communication diagram 300 for scheduling documents and setting classification labels for the scheduled documents. Although described in the context of scheduling documents, it is to be understood that labels may be selected and set using similar communications responsive to other triggering effects, such as the transmission, access, or manipulation of the data and/or generally based on user request to apply labels. The communications shown in diagram 300 may be performed between web client 302, which may be an example of and/or included in the web application 102 of FIG. 1 and/or the web client 202 of FIG. 2, a scheduler 304, a job server 306, and a client processing server 308, one or more of which may be included in backend 114 of FIG. 1 in some examples, a policy server SDK, which may be an example of policy server SDK 112 of FIG. 1 and/or policy server SDK 210 of FIG. 2, and file repository 312 (e.g., an output file repository service). In other examples, the scheduler 304, job server 306, and/or client processing server 308 may be included in one or more additional computing systems configured for the organization for which data classification labels are defined and used in the example scenario shown in FIG. 3.

At 314, the web client 302 may send a request to scheduler 304 to schedule (e.g., schedule distribution or processing of) a document or other data. The request may include one or more labels for classifying the data (e.g., selected from the labels retrieved according to a process such as that shown in the example communication diagram 200 of FIG. 2). The scheduler 304 may retrieve authentication information for the user of the web client and send a request to check rights and trigger scheduling of the document to the job server 306, as indicated at 316. At 318, the job server 306 may delegate the document scheduling and labelling of the document to the client processing server 308.

The client processing server 308 may refresh the document (e.g., convert a report template to a scheduled instance corresponding to the document scheduled at 302) and apply any formats chosen during scheduling (e.g., customizations, such as eventing, alerting, formatting, destination designations [e.g., e-mail, folder, storage location, etc.]) at 320. At 320, the client processing server 308 may also apply the label using the information protection service 310. In some examples, an additional or alternative rights check (e.g., confirming that the user is allowed to apply the selected label(s)) may be performed before sending the indication of the label to be applied to the information protection service 310. At 322, the information protection service 310 may apply the label as requested and generate a new file with the label applied. At 324, the information protection service 310 may send a confirmation that the label was applied and return the newly generated file (with the label applied) to the client processing server 308.

At 326, the job server 306 may persist an instance in the file repository 312. For example, instances may be created when a report, program object, or other data is scheduled to run, and may be stored in the file repository 312. The file repository 312 may manage the instances including scheduling destinations for the data. Accordingly, the persistence of the instance may ensure that the document scheduling requested at 314 is set with the label applied at 322. At 328, a status of the scheduling of the data (e.g., confirming that the schedule is set) is returned to the web client 302 from the job server 306.

Example Method

FIG. 4 is a flowchart of an example method 400 for managing data classification labels in accordance with one or more examples of the present disclosure. For example, method 400 may be performed by one or more components of a system, such as a system 100 of FIG. 1 and/or one or more of the components shown in communication diagrams 200 and 300 of FIGS. 2 and 3. In some examples, method 400 may be performed by executing instructions of one or more of the systems/services described above with respect to FIGS. 1-3.

At 402, the method includes receiving a request to fetch classification labels. The request may be received from a web application or other service executing on and/or via a client device operated by a user. In some examples, the request may include user authentication information and/or information regarding a type of data to which the classification labels correspond.

At 404, the method includes performing a rights check on a user and/or client requesting the classification labels. As indicated at 406, the rights check may be performed using received authentication information including a client identifier, client secret, and/or other information (e.g., any of the examples of authentication information described herein). In some examples, the rights check may be performed both at a client management server (e.g., prior to contacting a policy server, and performed using configuration information stored in a repository) and at a policy server (e.g., using authentication information passed from the client management server). Turning briefly to FIG. 6, an example user interface 600 for setting configuration information for classification providers is shown. The user interface 600 may include fields to set authentication information, such as a client ID, client secret, and/or certificate information (e.g., thumbprint) for use in authenticating a user at a policy server designated by a policy server URL. The configuration information may be set by an administrator of an organization by selecting a test configuration button 602, providing that the configuration information passes the test (e.g., successfully authenticates at the policy server indicated by the URL).

Returning to FIG. 4, at 407, the method includes determining if the rights check is passed (e.g., the authentication information matches information stored at the repository and/or matches information at the policy server for a validated client/user). If the rights check is not passed (e.g., "NO" at 407), access to the labels is denied, as indicated at 409, and the method returns. In some examples, a notification of the rights check failure may be returned to the requesting entity (e.g., the web application submitting the request at 402) and/or an opportunity to provide alternative authentication information may be provided. If the rights check is passed (e.g., "YES" at 407), the method includes receiving an access token from a policy server based on the authentication information, as indicated at 408. For example, the access token may be used by the policy server and/or an information protection service to control which labels are allowed to be retrieved for the user. In this way, the data classification labels are secured by controlling access based on an outcome of the rights check(s) using authentication information and/or certificate data.

At 410, the method includes retrieving classification labels from the policy server based on the authentication of the user. Retrieving the classification labels may include passing the access token to the policy server via a policy server SDK, which creates a policy server engine based on the access token to retrieve and return the labels from the policy server. In some examples, different sets of classification labels may be defined for different users, such that a given user is only allowed to utilize an associated subset of available classification labels defined for an organization, where the subset may be all of the available classification labels, some of the available classification labels, or none of the available classification labels. In some examples, each label may be defined as being authorized for use by a respective targeted user or group of users (e.g., all users, all users having above a threshold rank/role in an organization, all users of a selected one or more ranks/roles/groups of the organization, etc.). In additional or alternative examples, labels may be defined for use on a per-web application or per-client/tenant basis (e.g., all users of a targeted web application or all users of a client or other entity may be associated with the same client ID, client secret, and/or other authentication information and thus may be allowed access to the same labels).

At 412, the method includes propagating the classification labels to the client. For example, the labels may be provided to the web application used by the user to make the request at 402. The web application may display and/or other present the labels (or make the labels available for presentation) to the user. For example, as indicated at 414, the labels may be selectable by the user to be applied to the data in order to classify the data. In some examples, the labels may be used to assign a security, sensitivity, and/or other classification to the data in order to define a mechanism for handling the data upon storage and/or transmission. For example, as described above with respect to FIG. 3, scheduled documents with labels applied thereto may be handled in accordance with the applied labels.

Example Advantages

This solution is superior in comparison of approaches in the past with regards to at least the following considerations. The disclosed approach abstracts data classification labelling with a framework that enables multiple organizations, each having different labels for classifying data, to seamlessly integrate data classification labels into respective applications. Changes in labels managed by the framework are also seamlessly propagated across an organization's applications, as the applications retrieve the labels on an ad hoc basis using the framework, as described above. Generally, the solution described herein increases the reliability of data classification labelling and the user friendliness of applying data classification labels, while providing enhanced security through control of access to the data classification labels through robust authentication routines (e.g., the rights checks described herein).

Additional Examples

A first example of the disclosed technologies includes one or more computer-readable media storing instructions which, when executed by one or more hardware processors, cause the hardware processors to perform actions comprising: receiving, from an application, a request to fetch data classification labels, performing a rights check based on authentication information of the application (e.g., and/or for a client of the application), responsive to passing the rights check, receiving, from a policy server, an access token based on the authentication information, retrieving the data classification labels from the policy server using the access token, formatting the data classification labels for presentation via the application, and outputting, to the application, the formatted data classification labels for display via a graphical user interface of the application, the formatted data classification labels being selectable for applying to targeted data in the application.

A second example includes the first example and further includes the one or more computer-readable media, wherein performing the rights check comprises performing a first rights check at a central management server and performing a second rights check at the policy server.

A third example includes one or both of the first example and the second example, and further includes the one or more computer-readable media, wherein performing the first rights check comprises comparing the authentication information to information stored in a repository populated by configuration information set (e.g., by an administrator or other entity, or automated/semi-automated process) during an onboarding process.

A fourth example includes one or more of the first through third examples, and further includes the one or more computer-readable media, wherein performing the rights check comprises checking a certificate retrieved from the policy server against information stored in a repository populated by configuration information set (e.g., by an administrator or other entity, or automated/semi-automated process) during an onboarding process.

A fifth example includes one or more of the first through fourth examples, and further includes the one or more computer-readable media, wherein the authentication information includes one or more of a client identifier, a client secret, and a thumbprint for a certificate authentication.

A sixth example includes one or more of the first through fifth examples, and further includes the one or more computer-readable media, wherein the data classification labels are retrieved by creating a policy server engine at a policy server software development kit (SDK) using the access token and interfacing with the policy server using the policy server engine.

A seventh example includes one or more of the first through sixth examples, and further includes the one or more computer-readable media, wherein the policy server stores a plurality of sets of data classification labels for different tenants, and wherein the retrieved data classification labels are selected from the plurality of sets based on the access token and correspond to one or more of the application or the client.

An eighth example includes one or more of the first through seventh examples, and further includes the one or more computer-readable media, wherein the retrieved data classification labels are provided by the policy server in an array format, and wherein formatting the data classification labels comprises deserializing the data classification labels in the array format to form data usable by the graphical user interface of the application to display the data classification labels as selectable user interface elements.

A ninth example includes one or more of the first through eighth examples, and further includes the one or more computer-readable media, wherein at least a first data classification label of the data classification labels includes one or more subcategories that are displayed responsive to selection of the first data classification label in the graphical user interface.

A tenth example includes one or more of the first through ninth examples, and further includes the one or more computer-readable media, wherein the actions further comprise receiving a selection of a first data classification label of the data classification labels for applying to the targeted data, and performing an additional rights check after receiving the selection of the first data classification label.

An eleventh example includes one or more of the first through tenth examples, and further includes the one or more computer-readable media, wherein the actions further comprise sending, via a client processing server, a request to a policy server software development kit (SDK) to apply the first data classification label responsive to the selection of the first data classification label and after passing the additional rights check.

A twelfth example of the disclosed technologies includes a method performed by a computer, the method comprising: receiving, from a client application, a request to fetch data classification labels from a policy server, retrieving authentication information for the client application (e.g., and/or for a user of the client application) and passing the authentication information to the policy server, receiving, based on a rights check performed using the authentication information, an access token from the policy server, providing the access token to an interface for the policy server for use in generating a request for a list of data classification labels accessible via the access token, receiving the list of data classification labels, and generating, for output to the client application, output data corresponding to the list of data classification labels, the output data usable by the client application to generate a presentation of the list of data classification labels for selection by the user of the client application to classify data managed by the client application.

A thirteenth example includes the twelfth example, and further comprises the method, wherein the data managed by the client application comprises a file or document, and wherein the client application is configured to manage one or more of storing and communicating the file or document.

A fourteenth example includes one or both of the twelfth and the thirteenth examples, and further comprises the method, wherein providing the access token to an interface for the policy server comprises providing the access token to a policy server software development kit (SDK) configured to create a policy server engine based on the access token and generate a request for the list of data classification labels to be sent to the policy server.

A fifteenth example includes one or more of the twelfth example through fourteenth examples, and further comprises the method, wherein the rights check is performed at one or both of a central management server and the policy server based on the authentication information and wherein the rights check comprises a certificate check using data stored in a repository accessible by the central management server.

A sixteenth example includes one or more of the twelfth through fifteenth examples, and further includes the method, wherein the output data is generated by deserializing the list of data classification labels and translating the list of data classification labels to a format that is compatible with the client application.

A seventeenth example of the disclosed technologies includes a system, comprising: one or more hardware processors with memory coupled thereto, computer-readable media storing instructions executable by the one or more hardware processors, the instructions comprising: first instructions to retrieve data classification labels from a policy server based on at least a first rights check and propagate the data classification labels to an application executing on a web client, the first rights check being performed to secure the data classification labels by controlling access to the data classification labels based on a first transmission of authentication information from the application, second instructions to receive an indication from the application that a first data classification label of the data classification labels is to be applied to a data file, third instructions to perform a second rights check based on a second transmission of authentication information from the application, and fourth instructions to apply the first data classification label to the data file and process the data file in accordance with the applied first data classification label responsive to passing the second rights check.

An eighteenth example includes the seventeenth example, and further includes the system, wherein the second instructions comprise receiving a request to schedule a document to be processed.

A nineteenth example includes one or both of the seventeenth and the eighteenth examples, and further includes the system, wherein the instructions further comprise fifth instructions to return a schedule status responsive to processing the data file in accordance with the applied first data classification label.

A twentieth example includes one or more of the seventeenth through the nineteenth examples, and further includes the system, wherein processing the data file in accordance with the applied first data classification label includes persisting an instance for the data file at a file repository including a designation of the first data classification label.

A Generalized Computer Environment

FIG. 7 illustrates a generalized example of a suitable computing system 700 in which described examples, techniques, and technologies, including performing data classification management according to disclosed technologies can be implemented. For example, the computing system 700 and/or one or more elements of the computing system 700 may include and/or be included within one or more of the described components of system 100 of FIG. 1 and/or be used to perform operations and/or communications described in correspondence to FIGS. 2-6. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing annotation word-to-token alignment, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system and/or environment 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710. For example, the output device(s) 760 may output a graphical user interface configured to provide the labelling interface described with respect to FIG. 5 and/or the configuration setting interface described with respect to FIG. 6.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
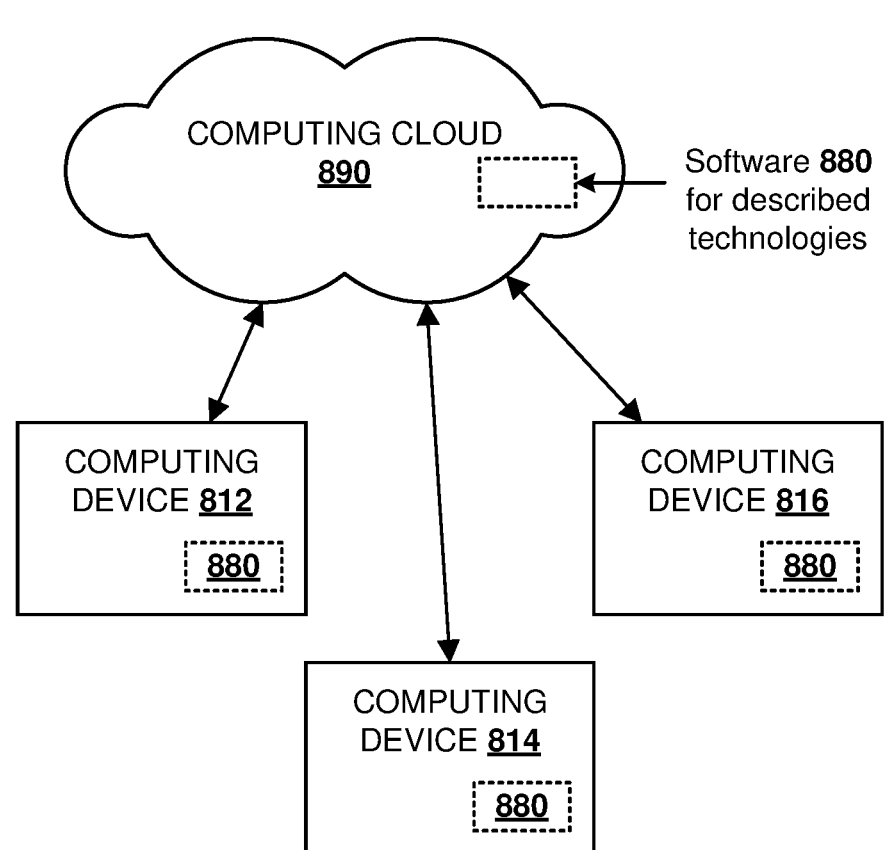
FIG. 8 is a diagram schematically depicting computing devices operating in conjunction with a computing cloud for implementation of disclosed technologies.

FIG. 8 depicts an example cloud computing environment 800 in which the described technologies can be implemented. For example, the computing environment 800 and/or one or more elements of the computing environment 800 may include and/or be included within one or more of the described components of system 100 of FIG. 1 and/or be used to perform operations and/or communications described in correspondence to FIGS. 2-6. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries).

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 724, and storage 740. The term computer-readable storage media does not include signals and carrier waves. In addition, the term computer-readable storage media does not include communication ports (e.g., 770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more hardware processors, cause the hardware processors to perform actions comprising:
   receiving, from an application executing on a client device, a request to fetch data classification labels;
   performing, at a central management server or a policy server, a rights check using authentication information of the application;
   responsive to passing the rights check, receiving, from the policy server, an access token based on the authentication information, wherein the access token controls which data classification labels of a plurality of data classification labels stored at the policy server are allowed to be retrieved for the application or a user of the application;
   retrieving a selected subset of the plurality of data classification labels from the policy server based on the request and using the access token, wherein the selected subset of the plurality of data classification labels are selected from the plurality of data classification labels based on the access token;
   formatting the selected subset of the plurality of data classification labels for presentation via the application to generate formatted data classification labels; and
   outputting, to the application, the formatted data classification labels for display via a graphical user interface of the application, the formatted data classification labels being selectable for applying to targeted data in the application to define a mechanism for handling the targeted data upon storage or transmission.

2. The one or more computer-readable media of claim 1, wherein performing the rights check comprises performing a first rights check at the central management server and performing a second rights check at the policy server.

3. The one or more computer-readable media of claim 2, wherein performing the first rights check comprises comparing the authentication information to information stored in a repository populated by configuration information set during an onboarding process.

4. The one or more computer-readable media of claim 1, wherein performing the rights check comprises checking a certificate retrieved from the policy server against information stored in a repository populated by configuration information set during an onboarding process.

5. The one or more computer-readable media of claim 1, wherein the authentication information includes one or more of a client identifier, a client secret, and a thumbprint for a certificate authentication.

6. The one or more computer-readable media of claim 1, wherein retrieving the selected subset of the plurality of data classification labels comprises creating a policy server engine at a policy server software development kit (SDK) using the access token and interfacing with the policy server using the policy server engine to retrieve and return the selected subset of the plurality of data classification labels.

7. The one or more computer-readable media of claim 1, wherein the policy server stores a plurality of sets of data classification labels for different tenants, and wherein the retrieved selected subset of the plurality of data classification labels are selected from the plurality of sets based on the access token and correspond to one or more of the application or the user.

8. The one or more computer-readable media of claim 1, wherein the retrieved selected subset of the plurality of data classification labels are provided by the policy server in an array format, and wherein formatting the selected subset of the plurality of data classification labels comprises deserializing the selected subset of the plurality of data classification labels in the array format to form data usable by the graphical user interface of the application to display the selected subset of the plurality of data classification labels as selectable user interface elements.

9. The one or more computer-readable media of claim 8, wherein at least a first data classification label of the selected subset of the plurality of data classification labels includes one or more subcategories that are displayed responsive to selection of the first data classification label in the graphical user interface.

10. The one or more computer-readable media of claim 1, wherein the actions further comprise receiving a selection of a first data classification label of the selected subset of the plurality of data classification labels for applying to the targeted data, and performing an additional rights check after receiving the selection of the first data classification label.

11. The one or more computer-readable media of claim 10, wherein the actions further comprise sending, via a client processing server, a request to a policy server software development kit (SDK) to apply the first data classification label responsive to the selection of the first data classification label and after passing the additional rights check.

12. A method performed by a computer, the method comprising:
receiving, from a client application executing on a client device, a first request to fetch data classification labels from a policy server;
retrieving authentication information for the client application and passing the authentication information to the policy server;
receiving, based on a rights check performed using the authentication information, an access token from the policy server, the access token controlling which data classification labels of a plurality of data classification labels stored at the policy server are allowed to be retrieved for the client application or a user of the client application;
providing the access token to an interface for the policy server for use in generating a second request for a list of data classification labels accessible via the access token, wherein the list of data classification labels comprises a subset of the plurality of data classification labels stored at the policy server selected based on the access token;
receiving the list of data classification labels based on the generation of the second request; and generating, for output to the client application, output data corresponding to the list of data classification labels, wherein generating the output data includes deserializing the list of data classification labels and translating the list of data classification labels to a format compatible with the client application, and wherein the output data is usable by the client application to generate a presentation of the list of data classification labels for selection by the user of the client application to classify data managed by the client application.

13. The method of claim 12, wherein the data managed by the client application comprises a file or document, and wherein the client application is configured to manage one or more of storing and communicating the file or document.

14. The method of claim 12, wherein providing the access token to an interface for the policy server comprises providing the access token to a policy server software development kit (SDK) configured to create a policy server engine based on the access token and generate a request for the list of data classification labels to be sent to the policy server.

15. The method of claim 12, wherein the rights check is performed at one or both of a central management server and the policy server based on the authentication information and wherein the rights check comprises a certificate check using data stored in a repository accessible by the central management server.

16. The method of claim 12, further comprising receiving a selection of a first data classification label of the list of data classification labels for applying to targeted data in the client application, performing an additional rights check after receiving the selection, and, responsive to passing the additional rights check, sending, via a client processing server, a request to a policy server software development kit (SDK) to apply the first data classification label to the targeted data.

17. A system, comprising:
one or more hardware processors with memory coupled thereto;
computer-readable media storing instructions executable by the one or more hardware processors, the instructions comprising:
first instructions to interface with a policy server and dynamically retrieve data classification labels from the policy server on request based on performance of at least a first rights check, and propagate the data classification labels to an application executing on a web client, the first rights check being performed to secure the data classification labels and comprising receiving, upon passing the first rights check, an access token controlling access to the data classification labels based on a first transmission of authentication information from the application and creating a policy server engine at a policy server software development kit (SDK) using the access token and interfacing with the policy server using the policy server engine to retrieve and return the data classification labels in accordance with rights provisioned to the application or a user of the application;
second instructions to receive an indication from the application that a first data classification label of the data classification labels is to be applied to a data file;
third instructions to perform a second rights check based on a second transmission of authentication information from the application; and
fourth instructions to apply the first data classification label to the data file and process the data file in accordance with the applied first data classification label responsive to passing the second rights check.

18. The system of claim 17, wherein the second instructions comprise receiving a request to schedule a document to be processed.

19. The system of claim 17, wherein the instructions further comprise fifth instructions to return a schedule status responsive to processing the data file in accordance with the applied first data classification label.

20. The system of claim 17, wherein processing the data file in accordance with the applied first data classification label includes persisting an instance for the data file at a file repository including a designation of the first data classification label.

* * * * *